United States Patent [19]

Litchford

[11] 4,115,771
[45] Sep. 19, 1978

[54] PASSIVE ATCRBS USING SIGNALS OF REMOTE SSR

[75] Inventor: George B. Litchford, Northport, N.Y.

[73] Assignee: Litchstreet Co., Northport, N.Y.

[21] Appl. No.: 797,675

[22] Filed: May 17, 1977

Related U.S. Application Data

[63] Continuation-in-part of Ser. No. 685,312, May 11, 1976, abandoned.

[51] Int. Cl.² ............................................. G01S 9/56
[52] U.S. Cl. ................................. 343/6 R; 343/6.5 R
[58] Field of Search ............. 343/6 R, 6.5 R, 6.5 LC, 343/112 TC

[56] References Cited

U.S. PATENT DOCUMENTS

| 3,895,382 | 7/1975 | Litchford | 343/6.5 LC |
| 3,921,172 | 11/1975 | Litchford | 343/6.5 LC |

Primary Examiner—T.H. Tubbesing
Attorney, Agent, or Firm—Henry Huff

[57] ABSTRACT

A virtual secondary surveillance radar (SSR) is provided at any desired location within the coverage area of an actual SSR by receiving the interrogations from the actual SSR and the transponder replies thereto. The received signals are processed to yield information as to the positions of the transponders with respect to the desired location, simulating the performance of an actual SSR at that location.

10 Claims, 2 Drawing Figures

1

PASSIVE ATCRBS USING SIGNALS OF REMOTE SSR

BACKGROUND

1. Related Application

This application is a continuation in part of application Ser. No. 685,312, filed May 11, 1976 now abandoned.

2. Field

This invention relates to radio location, as of mobile vehicles such as aircraft equipped with transponders.

3. Prior Art

Secondary surveillance radars have been used throughout the world for many years for monitoring and control of the transponder-bearing aircraft. In this application, they are commonly denoted ATCRBS, meaning Air Traffic Control Radar Beacon System. The operating frequencies, signal formats and procedures are standardized by international agreement. The system is usually operated with a ground-based control center, where human flight controllers monitor, and direct by radio, the flight activities in assigned sectors. Terminal radars at or near major airports provide local service, and favorably located en route radars serve cross-country airlanes.

There are presently about 600 SSRs in commission in the United States. All transmit interrogations on a carrier frequency of 1030 MHz, and all receive transponder replies on a carrier frequency of 1090 MHz. Many regions, particularly where air traffic is dense, are covered by the overlapping service areas of several SSRs. An aircraft at en route altitude often responds to many radars, some as distant as 100 miles or more. Shared carrier frequency operation of overlapping radars is made possible by assigning different beam rotation periods and different interrogation repetition patterns (rates and/or sequences) to different radars. Each radar is thus enabled to identify and process replies to its own interrogations, rejecting replies elicited by other radars.

Although the foregoing expedients are successful in the existing radar environment, there is some limit on the number of additional radars that could be accommodated without unacceptable deterioration in performance of the ATC system. Another limit is imposed by the cost of a radar installation. Many secondary airports of the general aviation type would benefit from SSR service, if it were economically feasible.

SUMMARY

According to this invention, service essentially equivalent to that of a local SSR can be simulated at a small general aviation airport, for example, by receiving the interrogations from and transponder replies to an actual SSR located elsewhere, say at a major airport miles away. The time relationships between the received signals, and the known distance and direction of the actual SSR provide all the information necessary to display the positions of the transponders relative to a reference location such as that of the small airport. No radar transmission from the reference location is required.

The time between reception of an interrogation and reception of a transponder reply thereto establishes the position of that transponder as being somewhere on a specific ellipse having one focus at the SSR and the other focus at the receiver location. The time between pointing of the SSR main beam axis at the transponder and at the reference location is a measure of the azimuthal angle between them from the SSR, which establishes the point of the position of the transponder on the ellipse. The positions of transponder equipped aircraft around the reference location may be usefully displayed in terms of the elliptical and SSR radial coordinates. However, it is readily possible and generally preferable to display the positions in polar coordinates centered on the reference location.

In cases where the reference location is obscured from the radar, as by intervening mountainous terrain, a standard transponder may be placed at some intermediate location to serve as a relay.

DRAWING

DESCRIPTION

Figure 1:
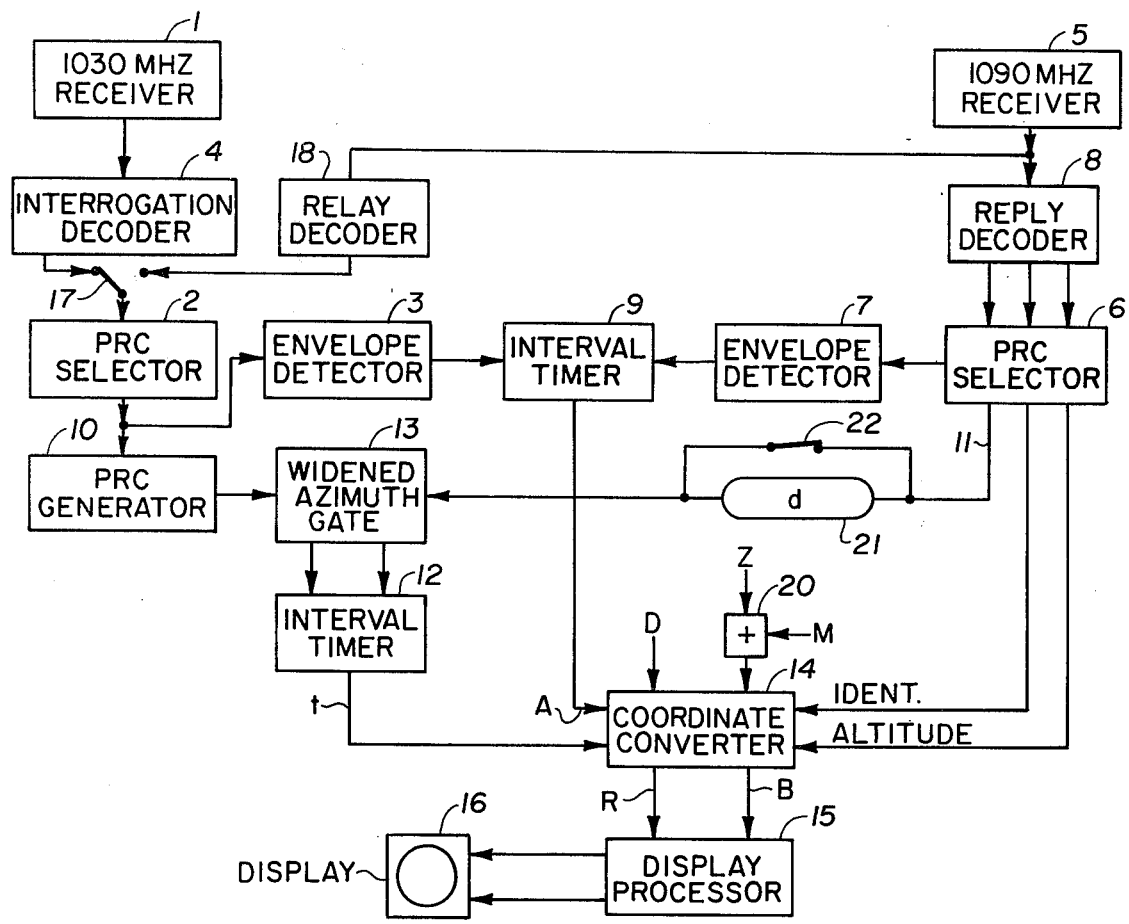
FIG. 1 is a block diagram showing a presently preferred embodiment of the invention.

Referring to FIG. 1, a 1030-MHz receiver 1, capable of receiving interrogations from a selected SSR located elsewhere, is coupled to an interrogation decoder 4, and thence through a double throw switch 17 and a pulse repetition characteristic (PRC) selector 2 to an envelope detector 3. A 1090-MHz receiver 5, capable of receiving transponder replies to the interrogations of the selected SSR, is coupled to a reply decoder 8 and through a PRC selector 6 to an envelope detector 7. The 1090-MHz receiver 5 is also coupled to a relay decoder 18, which is designed in known manner to respond only to a preselectable one of the 4096 available transponder reply codes. The decoder 18 is connected to the switch 17, which is arranged as shown to selectively apply either the output of the interrogation decoder 4 or that of the relay decoder 18 to the PRC selector 2.

The output of envelope detector 3 is applied to the start input terminal of an interval timer 9, and the output of envelope detector 7 is applied to the stop input terminal.

Timer 9 may be of the type described in U.S. Pat. No. 3,757,324 with reference to FIG. 6 thereof. The PRC selectors and the reply decoder 8 are like the devices used at conventional SSRs to select and decode the responses to their own interrogations. Interrogation decoder 4 is similar to that of a conventional transponder, being designed to provide a reply trigger pulse upon receipt of a valid interrogation.

A PRC generator 10 is designed to produce pulses in synchronism with the interrogations from the selected SSR when they are received, and continue to do so while they are not. Assuming switch 17 to be in the position shown, the generator 10 is resynchronized with the SSR each time the rotating radar beam sweeps by, maintaining a close approximation to a simulation of the pulses that would be present if interrogations were received continuously from the selected SSR.

The reply decoder 8 provides a pulse on line 11 in response to each transponder reply elicited by an interrogation from the selected SSR and received by receiver 5. A delay device 21 is included in line 11, and is arranged to be bypassed by a switch 22 when in its closed position as shown. With switch 22 closed, the output of PRC generator 10 and the pulses on line 11 are applied to the start and stop terminals of an interval timer 12, by way of a widened azimuth gate 13, which may be of the type described in U.S. Pat. No. 3,735,408. The timer 12 is similar to timer 9, but designed to measure shorter intervals of up to 100 microseconds, for example. Its output represents the differential time of arrival, $t$, between a pulse representing or simulating an interrogation from the selected SSR, and a corresponding reply thereto received by receiver 5.

Figure 2:
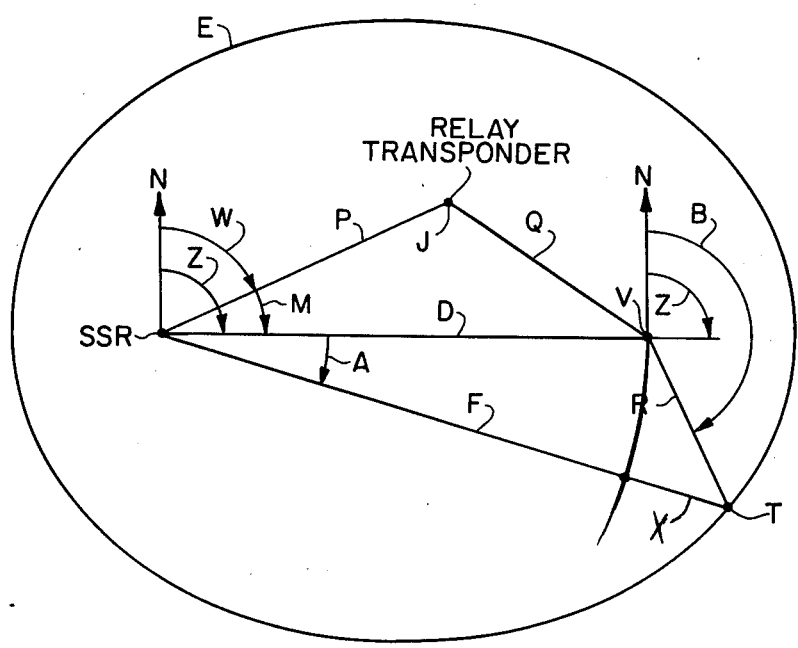
FIG. 2 is a geometrical diagram used in explaining the operation of the apparatus of FIG. 1.

Referring to FIG. 2, the apparatus of FIG. 1 is located at point V, which may be the site of a small general aviation airport, for example. The distance D and azimuth Z from an operating SSR are known, as from a survey map. T represents the position of a transponder equipped aircraft in the general neighborhood of V. R is the range and B is the bearing from V to T. A is the differential azimuth and X is the differential range between V and T from the SSR. In the illustrated case, both A and X are positive. If T were closer than V to the SSR, X would be considered negative.

Each reply received at V from the transponder at T follows the reception or simulation of the corresponding interrogation from SSR by the time interval $t$. With systemic delays compensated or accounted for, $$ct = R + X,$$

where $c$ is the velocity of radio propagation. Accordingly, the output of interval timer 12 (FIG. 1) is a measure of $R + X$.

Returning to FIG. 2, as the radar beam from the SSR rotates clockwise, it first illuminates the location V, and after some time interval, the transponder at T. Thus the output of the interval timer 9 of FIG. 1 is a measure of the differential azimuth A.

The geometry of FIG. 2 defines the location of T as a point on an ellipse E having one focus at the SSR and the other focus at V. The distance between the foci is D. The major axis, of length $ct + D$, is at the angle Z with respect to the reference direction N, and the eccentricity is $D/(ct + D)$. Point T is at the intersection of the ellipse E and the line F extending radially from the SSR at the differential azimuth angle A with reference to the line between SSR and V. Thus the plan position of T in FIG. 2 is completely determinable from the known quantities D and Z and the measured quantities A and $t$.

Returning to FIG. 1, inputs representing the above parameters are applied to a coordinate converter 14 which provides outputs R and B representing the position of the transponder T in polar coordinates centered on location V. The Z input is applied to the coordinate converter by way of an adding device 20 arranged to add a quantity M thereto. In this case, the quantity M may be set at zero. The converter 14 is a simple computer device, analog or digital, designed in known manner to perform the operation.

It is contemplated that a number of transponder equipped craft may be present simultaneously in the general area surrounding the point V. As in the usual SSR environment, their replies will ordinarily be received at different times without interfering with each other. As each reply is received, the coordinate converter 14 supplies the corresponding values of R and B to a display processor 15. The processor 15 also receives the respective identity and/or altitude information from the reply decoder 8, and associates this with the positional information by a display device 16. Processor 15 and display 16 may be like the corresponding elements used with conventional SSRs.

In some situations the SSR may be obscured from the reference location as by intervening elevated terrain. In such a case a standard aircraft transponder may be used as a relay for conveying the SSR interrogations to the reference location. The transponder is placed at some known elevated position J, as on a mountain top, generally intermediate to the SSR and the reference location, as shown in FIG. 2. The line of sight distances of point J from the SSR and reference location V are denoted P and Q respectively. The azimuth of point P from the SSR is W, shown in this example as less than Z by the amount M.

The distances D, P and Q and the angles M and Z are determined as from a survey map. The delay device 21 is set to provide a delay $$d = 1/c(P + Q - D) + t_o$$

where $c$ is the velocity of radio propagation and $t_o$ is the systemic delay in the relay transponder, typically about 3 microseconds. The angle M is set into the adding device 20. The relay transponder is adjusted to reply with an otherwise unassigned identity code, and the relay decoder 18 is adjusted to decode that code. Switch 17 is thrown to its right hand position and switch 22 is opened.

In the operation of the system in the relay mode with the SSR, relay transponder and reference location V positioned as shown in FIG. 2, the radar beam points first at the relay transponder, then, after an interval representing the angle M, at the reference location V, and then, after a further interval representing the angle A, at the transponder T. As a result, the interval timer 9 is started early by an amount corresponding to M, and its output represents $A + M$ instead of A. This is compensated by adding the amount M to the quantity Z in the device 20.

When the radar beam is illuminating the relay transponder at point J, that transponder broadcasts replies on the selected reply code, duplicating the PRC pattern of the SSR. These replies are received at the reference station V later than they would have been over the direct path from the SSR, by the amount $d$. This is compensated by adding an equivalent delay in the device 21 to the decoded replies of the target transponder T on line 11.

With the foregoing arrangements to compensate for the offset location of the relay transponder, the system operates essentially as previously described to display positions of transponders with respect to the reference location V. The position of the relay transponder at point J will also be displayed, affording a convenient check on the operation of the system.

I claim:

1. The method of determining the position of a transponder with respect to a reference position at a known location within the service area of a secondary surveillance radar (SSR), comprising the steps of
    (a) receiving interrogations from said SSR,
    (b) receiving transponder replies to said interrogations,
    (c) determining the differential azimuth A from the interval between reception of a group of interrogations and reception of a group of transponder replies,
    (d) determining the differential time of arrival $t$ from the interval between each interrogation, or a simulation thereof, and the corresponding reply, (e) computing from said quantities A and t, and the distance D and azimuth Z of said reference position from said SSR, the position of said transponder.

2. The method set forth in claim 1, wherein said step (a) comprises receiving said interrogations from said SSR indirectly by relaying said interrogations through a known relay position to said reference position, said step (c) includes compensating for azimuthal offset of said relay position from the direct line between the SSR and said reference position, and said step (d) includes compensating for the additional transit time delay introduced by said relaying.

3. The method set forth in claim 1, wherein said step (e) consists of
  (f) computing said transponder position in two coordinates, one radial to the SSR and the other elliptical about said SSR and reference position as foci, and
  (g) converting said transponder position to two other coordinates referred to said reference position.

4. The method set forth in claim 3, wherein said step (g) comprises converting said transponder position to range and bearing coordinates of said transponder from said reference position.

5. The method set forth in claim 1 further including the steps of
  (f) decoding said transponder replies to obtain identity and/or altitude reports from said transponder,
  (g) combining said reports with the positional information regarding said transponder, and
  (h) displaying said combined reports and position in combination.

6. Apparatus for indicating the position of a transponder with respect to a reference position at a known location within the service area of a secondary surveillance radar (SSR), comprising
  (a) means for receiving interrogations from said SSR,
  (b) means for receiving transponder replies to said interrogations,
  (c) means for measuring the interval between reception of a group of interrogations and the reception of a group of transponder replies to determine the differential azimuth A,
  (d) means for measuring the differential time of arrival t between an interrogation, or a simulation thereof, and the corresponding reply, and
  (e) means for computing the position of said transponder from said quantities A and t and the distance D and azimuth Z of said known location from said SSR.

7. The apparatus set forth in claim 6, wherein said means (a) comprises means for receiving said interrogations from said SSR indirectly, including means for relaying said interrogations by way of a known relay position to said reference position, said means (c) includes means for compensating for azimuthal offset of said relay position from the direct line between the SSR and said reference position, and said means (d) includes means for compensating for the additional transit time delay introduced by said relaying means and the additional path lengths between it and the SSR and reference position.

8. The apparatus of claim 6, wherein said computing means (e) comprises coordinate converter means for representing said transponder position in coordinates referenced to said reference position.

9. The apparatus of claim 6, wherein said computing means (e) comprises coordinate converter means for representing said transponder position in coordinates of the range R and bearing B of said transponder from said reference position.

10. The apparatus of claim 6, further including
  (f) means for decoding said transponder replies to provide identity and/or altitude reports from said transponder,
  (g) display processor means for combining said reports with the positional information regarding said transponder, and
  (h) means for displaying said combined reports and position.

* * * * *